United States Patent
Seibold et al.

(10) Patent No.: US 9,511,687 B2
(45) Date of Patent: Dec. 6, 2016

(54) SEAT ADJUSTMENT DEVICE FOR VERTICAL ADJUSTMENT OF A VEHICLE SEAT

(71) Applicant: Johnson Controls Technology Company, Holland, MI (US)

(72) Inventors: Kurt Seibold, Whitmore Lake, MI (US); Alexander I Balin, Ann Arbor, MI (US); Ingo Kienke, Wermeiskirchen (DE); Jorg Linnenbrink, Wuppertal (DE)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 14/399,038

(22) PCT Filed: May 7, 2013

(86) PCT No.: PCT/US2013/039860
§ 371 (c)(1),
(2) Date: Nov. 5, 2014

(87) PCT Pub. No.: WO2013/169718
PCT Pub. Date: Nov. 14, 2013

(65) Prior Publication Data
US 2015/0076309 A1    Mar. 19, 2015

Related U.S. Application Data

(60) Provisional application No. 61/643,587, filed on May 7, 2012, provisional application No. 61/803,834, filed on Mar. 21, 2013.

(51) Int. Cl.
*F16M 13/00* (2006.01)
*B60N 2/16* (2006.01)

(52) U.S. Cl.
CPC ............. *B60N 2/1625* (2013.01); *B60N 2/163* (2013.01)

(58) Field of Classification Search
CPC .. B60N 2/067; B60N 2/0705; B60N 2/0715; B60N 2/1625
USPC ........................ 248/424, 429, 421, 420, 157; 296/65.01, 65.11, 65.13; 297/311, 331, 297/344.1, 344.12, 344.13
See application file for complete search history.

(56) References Cited

U.S. PATENT DOCUMENTS

| | | | |
|---|---|---|---|
| 3,220,767 A | 11/1965 | Hendrickson | |
| 3,695,696 A | 10/1972 | Lohr et al. | |

(Continued)

FOREIGN PATENT DOCUMENTS

| | | |
|---|---|---|
| DE | 893854 C | 10/1953 |
| DE | 2152104 A1 | 4/1973 |

(Continued)

OTHER PUBLICATIONS

Office Action for U.S. Appl. No. 14/399,007 dated Oct. 27, 2015.
(Continued)

*Primary Examiner* — Todd M Epps
(74) *Attorney, Agent, or Firm* — The Dobrusin Law Firm, P.C.

(57) ABSTRACT

Seat height adjustment having vertical slots (21, FIG. 3) provided on the seat structure (20) and a displacer (14) which is provided with tilted slots (15) and which can be moved horizontally in order to lift or lower the seat.

8 Claims, 6 Drawing Sheets

(56) References Cited

U.S. PATENT DOCUMENTS

| | | |
|---|---|---|
| 3,759,587 A | 9/1973 | Christin |
| 3,874,727 A | 4/1975 | Mehnert et al. |
| 3,877,750 A | 4/1975 | Scholpp |
| 4,379,589 A | 4/1983 | Marino |
| 4,451,085 A | 5/1984 | Franck et al. |
| 4,502,730 A | 3/1985 | Kazaoka et al. |
| 4,585,272 A | 4/1986 | Ballarini |
| 4,647,109 A | 3/1987 | Christophersen et al. |
| 4,913,493 A | 4/1990 | Heidmann |
| 4,995,669 A | 2/1991 | Croft |
| 4,997,223 A | 3/1991 | Croft |
| 5,067,772 A | 11/1991 | Koa |
| 5,154,476 A | 10/1992 | Haider et al. |
| 5,163,735 A | 11/1992 | Aljundi |
| 5,251,864 A | 10/1993 | Itou |
| 5,320,410 A | 6/1994 | Faiks et al. |
| 5,346,281 A | 9/1994 | Hughes |
| 5,433,507 A | 7/1995 | Chang |
| 5,466,048 A | 11/1995 | Fowler et al. |
| 5,468,048 A | 11/1995 | Clemens et al. |
| 5,577,811 A | 11/1996 | Ogg |
| 5,704,691 A | 1/1998 | Olson |
| 5,733,008 A | 3/1998 | Tame |
| 5,934,753 A | 8/1999 | Lange |
| 5,984,407 A | 11/1999 | Ligon, Sr. et al. |
| 6,022,075 A | 2/2000 | Blocker et al. |
| 6,193,318 B1 | 2/2001 | Becker et al. |
| 6,341,819 B1 | 1/2002 | Kojima et al. |
| 6,422,651 B1 | 7/2002 | Mühlberger et al. |
| 6,520,581 B1 | 2/2003 | Tame |
| 6,565,156 B1 | 5/2003 | Yamashita et al. |
| 6,592,186 B1 | 7/2003 | Mühlberger et al. |
| 6,609,753 B2 | 8/2003 | Schmidt-Schaeffer |
| 6,935,693 B2 | 8/2005 | Janscha et al. |
| 6,955,399 B2 | 10/2005 | Hong |
| 7,278,686 B2 | 10/2007 | Yoshida |
| 7,740,316 B2 | 6/2010 | Beneker et al. |
| 7,837,273 B1 | 11/2010 | Ratza et al. |
| 7,926,879 B2 | 4/2011 | Schmitz et al. |
| 7,959,229 B2 | 6/2011 | Ishijima et al. |
| 8,162,404 B2 * | 4/2012 | Ueda ............ B60N 2/0296 297/344.12 |
| 8,333,530 B2 | 12/2012 | Omori |
| 8,376,456 B2 * | 2/2013 | Fujita ............ B32B 7/12 297/216.1 |
| 8,480,152 B2 * | 7/2013 | Shimizu ............ B60N 2/3011 296/65.09 |
| 2002/0060487 A1 | 5/2002 | Makosa |
| 2002/0089225 A1 | 7/2002 | Bruck et al. |
| 2003/0006636 A1 | 1/2003 | Ligon, Sr. et al. |
| 2003/0218368 A1 * | 11/2003 | Akaike ............ B60N 2/0232 297/330 |
| 2004/0160099 A1 | 8/2004 | Hong |
| 2005/0062326 A1 | 3/2005 | Kim et al. |
| 2005/0179290 A1 | 8/2005 | Hancock et al. |
| 2005/0285008 A1 | 12/2005 | Beneker et al. |
| 2006/0055219 A1 | 3/2006 | Heimann et al. |
| 2006/0152051 A1 | 7/2006 | Colja et al. |
| 2006/0226683 A1 | 10/2006 | Massara et al. |
| 2006/0244293 A1 | 11/2006 | Buffa |
| 2007/0090263 A1 | 4/2007 | Yamada et al. |
| 2007/0108816 A1 | 5/2007 | McQueen et al. |
| 2009/0026811 A1 | 1/2009 | Samain et al. |
| 2009/0096263 A1 | 4/2009 | Samain et al. |
| 2009/0174241 A1 | 7/2009 | Pattyn et al. |
| 2009/0288270 A1 | 11/2009 | Yamashita |
| 2010/0026069 A1 | 2/2010 | Bruck et al. |
| 2010/0026070 A1 | 2/2010 | Rohee et al. |
| 2010/0096897 A1 | 4/2010 | Kienke et al. |
| 2010/0117419 A1 | 5/2010 | Schmitz et al. |
| 2010/0133732 A1 | 6/2010 | Yamaguchi et al. |
| 2010/0201173 A1 | 8/2010 | Boes |
| 2011/0006581 A1 | 1/2011 | Funk et al. |
| 2011/0042514 A1 | 2/2011 | Ehlers et al. |
| 2011/0042515 A1 | 2/2011 | Schoke et al. |
| 2011/0115268 A1 | 5/2011 | Maierhofer et al. |
| 2011/0127817 A1 | 6/2011 | Yu et al. |
| 2011/0304188 A1 | 12/2011 | Aktas |
| 2011/0316317 A1 | 12/2011 | Sprenger et al. |
| 2012/0133183 A1 | 5/2012 | Kim et al. |
| 2012/0228911 A1 | 9/2012 | Piretti |
| 2013/0075571 A1 | 3/2013 | Suck et al. |
| 2013/0218368 A1 | 8/2013 | Kokes |
| 2013/0248675 A1 | 9/2013 | Ewald et al. |
| 2013/0313876 A1 | 11/2013 | Perrin |
| 2013/0341982 A1 | 12/2013 | Maierhofer et al. |
| 2014/0138996 A1 | 5/2014 | Kramm et al. |
| 2015/0108805 A1 | 4/2015 | Linnenbrink et al. |
| 2015/0151653 A1 | 6/2015 | Furuta |
| 2015/0203011 A1 | 7/2015 | Fujita et al. |
| 2015/0314709 A1 | 11/2015 | Kim et al. |

FOREIGN PATENT DOCUMENTS

| | | |
|---|---|---|
| DE | 2723722 A1 | 12/1978 |
| DE | 3937818 A1 | 5/1991 |
| DE | 19639109 A1 | 3/1998 |
| DE | 19961070 C1 | 4/2001 |
| DE | 202006007862 U1 | 9/2007 |
| DE | 102008039166 A1 | 2/2010 |
| DE | 102009043298 A1 | 5/2011 |
| DE | 102011106219 A1 | 1/2012 |
| EP | 0842807 A1 | 5/1998 |
| FR | 703111 A | 4/1931 |
| FR | 2718398 A | 10/1995 |
| FR | 2889120 A1 | 2/2007 |
| JP | S5735648 B2 | 7/1982 |
| JP | S57143930 U | 9/1982 |
| JP | 59177009 A | 10/1984 |
| JP | S608121 A | 1/1985 |
| JP | 60160911 A | 8/1985 |
| JP | S616038 A | 1/1986 |
| JP | S6275735 U | 5/1987 |
| JP | S6328043 U | 2/1988 |
| JP | H04189635 A | 7/1992 |
| JP | H04115448 U | 10/1992 |
| JP | H07205690 A | 8/1995 |
| JP | 2001105949 A | 4/2001 |
| JP | 2003341393 A | 12/2003 |
| JP | 2005289187 A | 10/2005 |
| JP | 2009154821 A | 7/2009 |
| KR | 2019970008834 A | 3/1997 |
| KR | 1020030064150 A | 7/2003 |
| KR | 1020100049059 A | 5/2010 |
| WO | 93/25404 A1 | 12/1993 |
| WO | 94/07393 A1 | 4/1994 |
| WO | 9501888 A1 | 1/1995 |
| WO | 9720706 A1 | 6/1997 |
| WO | 03/068557 A1 | 8/2003 |
| WO | 2012/009515 A1 | 1/2012 |
| WO | 2012009515 A1 | 1/2012 |
| WO | 2013/167975 A2 | 11/2013 |
| WO | 2013/169714 A1 | 11/2013 |
| WO | 2013/169715 A1 | 11/2013 |
| WO | 2013/169717 A1 | 11/2013 |
| WO | 2013/169718 A1 | 11/2013 |
| WO | 2013/169719 A1 | 11/2013 |
| WO | 2013/169720 A1 | 11/2013 |

OTHER PUBLICATIONS

Office Action for U.S. Appl. No. 14/398,498, dated Sep. 24, 2015.
Office Action for U.S. Appl. No. 14/398,577, dated Sep. 22, 2015.
Japanese Office Action for Japanese Application No. 2015-511603, dated Dec. 22, 2015.
International Preliminary Report on Patentability for Application No. PCT/US2013/039860; dated Nov. 20, 2014.
Search Report for Application No. PCT/US2013/039860, dated Apr. 7, 2013.
Office Action for U.S. Appl. No. 14/398,498 dated Jun. 8, 2016.

(56) References Cited

OTHER PUBLICATIONS

Office Action for U.S. Appl. No. 14/399,007 dated Apr. 29, 2016.
Office Action for U.S. Appl. No. 14/399,015 dated Feb. 16, 2016.
Office Action for U.S. Appl. No. 14/399,015 dated Aug. 18, 2016.
Office Action for U.S. Appl. No. 14/398,768 dated Jun. 9, 2016.
Office Action for U.S. Appl. No. 14/398,820 dated May 13, 2016.

* cited by examiner

SEAT ADJUSTMENT DEVICE FOR VERTICAL ADJUSTMENT OF A VEHICLE SEAT

CLAIM OF PRIORITY

This application claims priority to U.S. Application Ser. No. 61/643,587, filed May 7, 2012 and 61/803,834, filed Mar. 31, 2013, the entire contents thereof are incorporated herein by reference.

The present invention relates to a seat adjustment device for vertical adjustment of a seat, especially for a motor vehicle.

A seat adjustment device is a device for adjusting the position and/or orientation of the seat or seat parts, for example the seat cushion and/or backrest.

Nowadays, seat adjustment devices are commonly used for seats of meter vehicles, where the seat is moved along en adjustment direction and/or tilted at an adjustment angle relative to the vehicle chassis. Additionally or alternatively, the seat parts may be moved and/or tilted relative to each other or relative to the vehicle chassis. For example, the backrest may be tilted relative to the seat cushion or the whole seat may be moved along a horizontal direction within a driving plane, wherein the driving plane is arranged parallel to the driving direction. Security means disposed in the seat, such as an impact tube, typically restrict the movement of the seat or of seat parts. For example, the vertical adjustment of the seat or seat cushion in conventional seat adjustment devices includes a movement of the seat or the seat cushion not only into the vertical direction, but also into the driving direction. However, the accompanied movement of the seat or the seat cushion into the horizontal direction during its vertical adjustment is deemed inconvenient and negative by the users of the seat.

An object of the present invention was to obviate the above mentioned disadvantages of the known seat adjustment devices.

The object is achieved with a seat adjustment device which adjusts the height of a seating element relative to a the body of a vehicle, wherein the seating element comprises a structure, wherein a guiding means is provided at the structure, which restrict the movement of the seating element during the height adjustment.

The present invention relates to a seat adjustment device which adjusts the height of a seating element relative to a the body of a vehicle. The seating element comprises a structure, for example a frame. In this structure, a guiding means, for example a slot or a slotted hole is provided, which restrict the movement of the seating element during the height adjustment.

Furthermore, the seat adjustment device comprises a structural element fixedly attached to the bracket. In particular, the structural element is fixed to the bracket to track the bracket when the bracket is moved. The structure of the seating element comprises guiding means fm guiding the seating element parallel to a vertical direction by coupling to the structured element. In particular, the movement of the seating element is constrained by the structure element such that the seating element cannot be moved into an essentially horizontal direction relative to the bracket. In particular, the guiding means are fixedly attached to the structure of the sleeting element or provided as an integral part of the structure of the seating element. The seat adjustment device further comprises transmission means coupled to the structural element to transmit a movement of the transmission means into a movement of the seating part relative to the structural element, in particular parallel to the vertical direction, in coaction with the guiding means. The seat adjustment device, in particular the vertical seat adjustment device, is provided for lifting the seating element of the seat, for example a cushion attached to the seating element, in particular a cushion for the seating element of a motor vehicle seat. The seat adjustment device is provided for lifting a user seated on the seating element. A structural element is fixedly attached to the bracket with the purpose of keeping the seat and/or the seating element in its position relative to the chassis at the vehicle in case of a crash. Such a structural element is for example a tube, also called impact tube. The guiding means are arranged such that the seating element is guided essentially along the vertical direction. The vertical direction is herein defined as a direction essentially parallel to the direction of the gravitational force and/or perpendicular to a plane of possible driving directions of the motor vehicle. The horizontal direction is essentially parallel to the driving direction. The guiding means are in particular configured to constrain the movement of the seating element to a movement perpendicular to the horizontal direction, wherein the seating element is thus only movable along the vertical direction. The guiding means is particular a slotted hole for sliding along the structural element, in particular the impact tube, along a main direction of extension of the slotted hole, which is in particular the vertical direction. The structural element or impact tube is further coupled to the transmission means, wherein the transmission means is in particular constructed as a further slotted hole. Preferably, the transmission means is a slotted hole of a displacer means, wherein the displacer means slides along the structural element or impact tube into a direction defined by the main direction of extension of the slated hole. Preferably, the slotted hole is configured to constrain the movement of the displacer means. Preferably, the movement of the displacer means causes a vertical movement of the cushion pan or seating element. The displacer means is here also called wedging element. The transmission means are moveable relative to the guiding means, in particular essentially along the horizontal direction. Due to the coupling of the transmission means to the structural element and the coupling of the structural element to the guiding means, a substantial horizontal movement of the transmission means relative to the guiding means is transmitted or converted into a vertical movement of the seating element. Since the structural element is fixedly connected with the bracket, the seating element is thereby moved relative to the bracket along the vertical direction, in particular lifting a user of the seat up and/or down. In particular, the seating element is thereby lifted and lowered between a lower seating position and an upper seating position, in particular by the displacer means. The transmission means are coupled to the structural element to transmit a movement of the transmission means into a movement of the seating element in coaction with the guiding means. Thus, by moving the transmission means, in particular substantially along a horizontal direction, between a first end position and a second end position the seating element is vertically adjusted by lifting the seating element between a lower position and an upper position.

Preferably, said bracket comprises a structural element, preferably a tube.

Preferably, said structural element is engaged with a slotted hole of the displacer means, wherein a main direction of extension of the slotted hole is preferably tilted relative to the horizontal direction.

Preferably, said structural element is engaged with the guiding means, said guiding means preferably being slotted holes having a main direction of extension arranged parallel to the vertical direction and preferably tilted relative to the slotted holes of the displacer means.

Preferably, the structural element is a tube, in particular an impact tube, for the seating element and/or the seat.

Preferably, the guiding means is a slotted hole of a guiding element, the guiding element being fixedly attached to the structure) or being an integral part of the structure. Preferably the seating element is guided along a main direction of extension of the slotted hole of the guiding means, wherein the main direction of extension of the slotted hole of the guiding means is arranged parallel to the vertical direction.

Preferably the bracket is fixedly connected to a chassis of the vehicle, at least with regard to a vertical movement of the bracket relative to the chassis.

Preferably, the transmission means is a slotted hole of a displacer means, wherein the displacer means is guided along a main direction of extension of the slotted hole of the displacer means relative to the structural element, wherein the main direction of extension of the slotted hole of the displacer roan is tilted at an angle relative to the main direction of extension of the slotted hoe of the guiding means.

Preferably, a ramp is formed by an edge of the slotted hole of the displacer means, wherein the displacer means is guided along the ramp of the slotted hole of the displacer means.

Preferably, the angle is between 10 degrees and 80 degrees or between 100 degrees and 170 degrees, more preferably between 30 degrees and 60 degrees or between 120 degrees and 150 degrees, even more preferably approximately 45 degrees or approximately 215 degrees.

Preferably, the displacer means is movable relative to the bracket, wherein in a first end position of the displacer means a top portion of the slotted hole of the guiding means overlaps with a top portion of the slotted hole of the displacer means, wherein when the displacer means is in the first end position the seating element is in a lower position, wherein in a second end position of the displacer means a bottom portion of the slotted hole of the guiding means overlaps with a bottom portion of the displacer means, wherein when the displacer means is in the second end position the seating element is in an upper position vertically above the lower position.

Preferably, the seat adjustment device further comprises drive means for driving the transmission means in an interlocking manner, wherein the drive means is manually and/or automatically, in particular electrically, operated.

Preferably, the drive means comprise a pinion, in particular rotatably attached to the seating element, wherein the pinion is interlocked with a rack, wherein the rack is fixedly coupled with the transmission means.

According to the present invention, a seat adjustment device for a seat, in particular for a motor vehicle, is provided having improved user convenience arid crash safety.

The user convenience is improved by providing a seat adjustment device for vertical adjustment of the seating element without movement of the seating element along the horizontal direction or driving direction. Additionally, by providing the structural element, in particular the tube or impact tube, which is fixedly connected with the bracket, the crash safety is improved relative to conventional seat adjustment devices having no structural element. In particular, in case of a crash, the structural element keeps the seat or seating element in its place relative to the chassis of the vehicle. In particular, the force exerted on the seating element during a crash is transmitted from the structure of the seating element and the guiding means via the structural element into the chassis.

By providing a positive interlocking connection between the drive means and the displaces means, it is possible to efficiently adjust the height of The seating element both manually and automatically. Moreover, minimal loads are transmitted into a locking mechanism of the seating element during an impact. Moreover, the seat adjustment device allows for a vertical adjustment of the seating element, and in particular the cushion of the seating element, by reducing the amount of mass to be lifted.

Preferably, the guiding means is provided in the region of the thigh rest.

According to a preferred embodiment, the rear region of the seating element is also adjustable in height relative to the body of the vehicle.

Preferably, the rear region comprise pivot leaver, which lowers and lifts the rear region of the seating element.

According to another preferred embodiment of the present invention guiding means (21') are provided at the rear region of the structure of the seating element.

Preferably, the displacer means comprises a slotted hole at its rear end.

The inventions are explained it the following text on the basis of FIGS. 1-10. These explanations are merely by way of example and do not limit the general concept of the invention.

In the figures:

FIG. 1 schematically shows e perspective illustration of e vehicle seat,

FIG. 2 schematically shows a perspective illustration of a first embodiment of the seat adjustment device of the vehicle seat FIG. 3 schematically shows a sectional illustration of a vehicle seat with a seat adjustment device, FIG. 4 schematically shows a sectional illustration of a seating element and a disputer element, FIG. 5 schematically shows a perspective illustration of a seating element of a motor vehicle, FIG. 6 schematically shows a perspective illustration of a second embodiment of the seat adjustment device, FIG. 7 schematically shows a sectional illustration of a second embodiment of the seat adjustment device.

Parts that correspond to one another are provided with the same reference signs in all of the figures.

Figure 1:
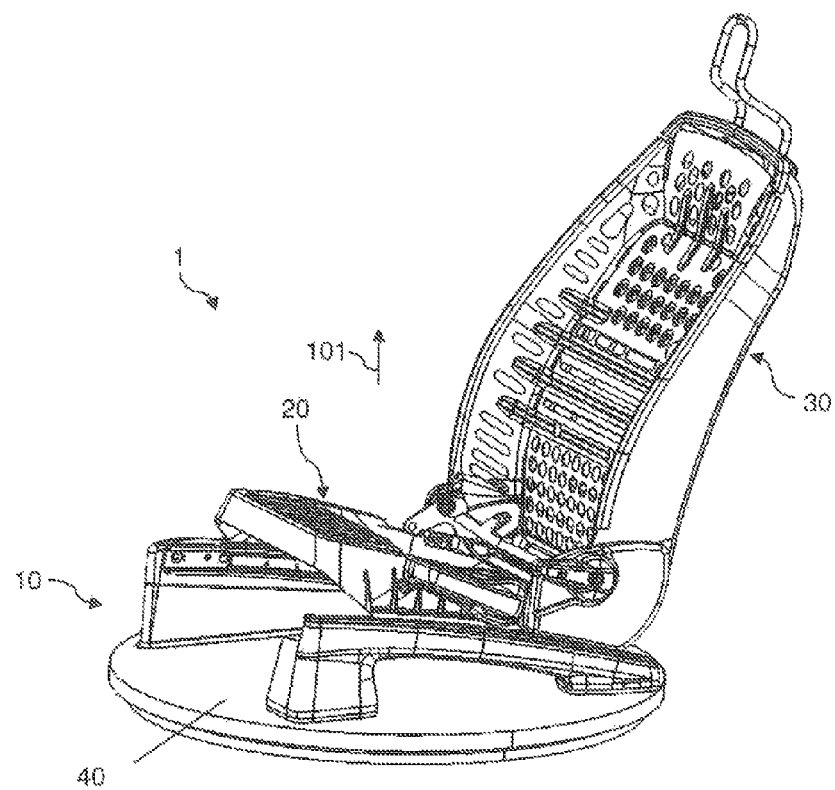

FIG. 1 schematically shows a perspective illustration of a vehicle seat 1. The seat 1 comprises a seating element 20, in particular for placing a cushion (not shown) on the seating element 20. The seat 1 further comprises a backrest 30, in particular an adjustable backrest being finable relative to the seating element 20. The seat 1 further comprises a seat adjustment device 10 for a vertical adjustment of the whole seat 1 into a vertical direction 101, wherein the vertical direction 101 is arranged substantially perpendicular to a horizontal plane of all possible driving directions and/or substantially perpendicular to a plane of main extension of the seating part 20. The seat adjustment device 10 may further be configured for adjustment of the wrote seat within the horizontal plane, for example parallel to the driving direction 102.

Figure 2:
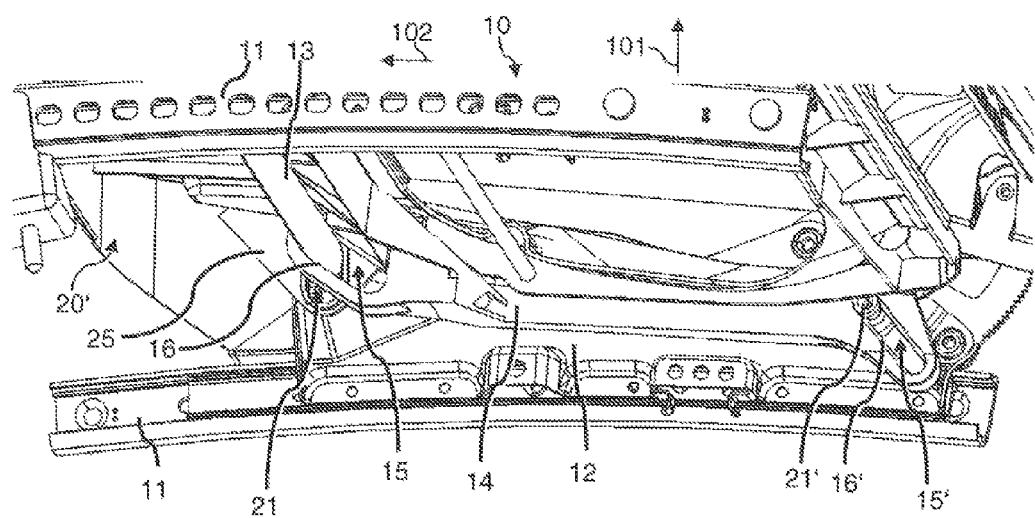

FIG. 2 schematically shows a perspective illustration of a first embodiment of the seat adjustment device 10 of the vehicle seat 1. The seat adjustment device comprises a seating element 20 with a structure 20', a bracket 12 and displacer means located between the bracket 12 and the structure 20', wherein the displaces means 14 are moved in an essentially horizontal direction 10 and thereby lower and lift the seating element 20, wherein guiding means 21 are provided at the structure 20' which restrict the movement of the seating element 20 to an essentially vertical direction 101. The seat adjustment device 10 comprises guide rails 11 for sliding the seat 1 forwards and backwards along a main direction of extension of the guide rails 11 parallel to the horizontal direction 102. The bracket 12 being slidable arranged along the guide rails 11, wherein a guiding means 21, in particular formed as a slotted hole 21 or long-hole 21, is arranged on the structure 20' of the seating element 20 or on a guiding element 25 fixedly attached, in particular by a force-fitted or welding connection, to the structure 20'. The guiding means 21 are configured to constrain the movement of the seating element 20 relative to the structural element 13, in particular a tube 13 or impact tube 13 such that the seating element 20 is preferably moveable only parallel to the vertical direction 101. The structural element 13 is fixedly connected, in particular by a force-fitted or welding connection, to the bracket 12 or the structural element 13 is an integral part of the bracket 12. Preferably, the guiding means 21 are arranged such that the structural element 13 of the bracket 12 absorbs the force, in particular the force acting parallel to the horizontal direction 102, acting on the seat 1 during a crash. In particular, the seat adjustment device 10 comprises further guiding means 2121' (see FIG. 3) and a further structural element (not shown). The seat adjustment device 10 further comprises the displacer means 14 comprising a transmission means 15, in particular in the form of a slotted hole. In particular, a ramp 16 is formed by the transmission means 15 on the displacer means 14, in particular by an edge of the slotted hole 15 of the transmission means 15. The displacer means 14 is in particular movable relative to the bracket 12 along the horizontal direction 102 relative to the seating part 20. The transmission means 15 are guided by the structural element 13, in particular via the ramp 16, such that the seating element 20 is lifted and lowered parallel to the vertical direction 101 by the displacer means 14, if the displacer means 14 is moved parallel to the horizontal direction 102. Thus, a movement of the displacer means 15 parallel to the horizontal direction 102 is transmitted into a movement of the structural element 15 parallel to the vertical direction 101, and therefore in particular of the seating element 20. In particular, the displacer means 14 comprises a further transmission means 15' with a further ramp 16' for guiding a further structural means 13', wherein the further transmission means 15' is of the same construction as the transmission means.

Figure 3:
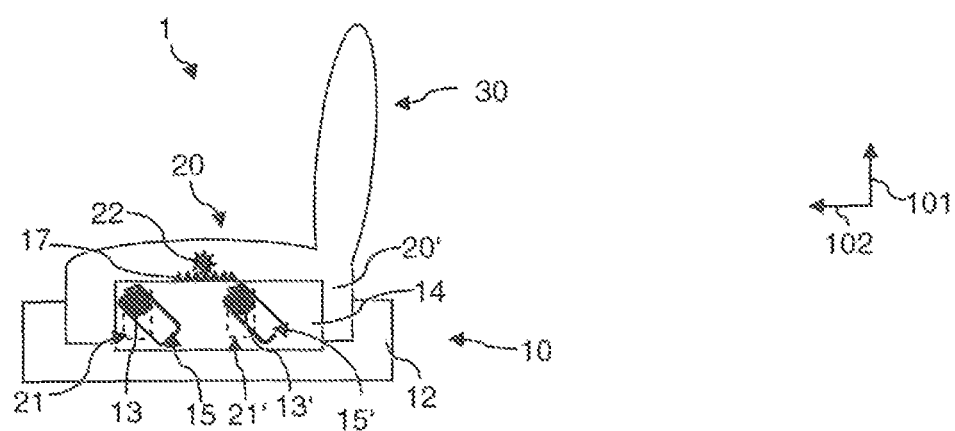

FIG. 3 schematically shows a sectional illustration of a vehicle seat 1 with a seat adjustment device 10. The seat adjustment device 10 is configured to lift the seating element 20, in particular the cushion or whole vehicle seat 1 including the backrest 30, parallel to the vertical direction 101 between a lower position and an upper position, wherein in FIG. 3 the lower position is shown. The seat adjustment device 10 comprises drive means 22 for driving a displacer means 14 of the seat adjustment system 10 into the horizontal direction 102. Here, the drive means 22 includes a pinion 22, which is in particular rotatably adjusted on the seating element 20. The pinion is provided for driving a rack 17, which is fixedly attached to the displacer means 14, or which is an integral part of the displacer means 14. Hence, the displacer means 14 is driven by the drive means 22 in a positive interlocking manner parallel to the horizontal direction 102. The bracket comprises the structural element 13, which is an integral part of the bracket 20 or fixedly connected to the bracket 12, for example by a welding joint or another force-fitted connection. In particular, the bracket 1 comprises a further equivalently constructed structure element 13'. The seating element 13 is constraint relative to a movement into the horizontal direction 102 by the guiding means 21 at the structure 20 of the seating element 20. The displacer means 14 comprises transmission means 15 for the transmission of a movement of the displacer means 14 essentially parallel to the horizontal direction 102 to e movement of the seating element 20 essentially parallel to the vertical direction 101. The seating element 20 is thereby guided by the guiding means 21 into the vertical direction 101. The transmission means 15 is in particular a slotted hole 15 of the displacer means 14, which guides the displacer means 14 along a main direction of extension of the slotted hole 15 of the displacer means 14. Here, the main direction of extension of the slotted hole 16 of the displacer means 14 is tilted at an angle relative to the main direction of extension of the slotted hole 21 of the guiding element at the structure 20' of the seating element 20. In particular, the the ramp 16 (see FIG. 2) of the slotted hole 15 of the displacer means 14 is guided along the structural element 13 of the bracket 12. Preferably, the angle is between 10 degrees and 80 degrees or between 100 degrees and 170 degrees, more preferably between 30 degrees and 60 degrees or between 120 degrees and 150 degrees, even more preferably approximately 45 degrees or approximately 215 degrees. Preferably, the displacer means 14 is movable relative to the bracket 12, wherein in a first end position of the displacer means 14 a top portion of the slotted hold 21 of the guiding means 21 at the structure 20' overlaps with a top portion of the slotted hole 15 at the displacer means 14. When the displacer means 14 is in the first end position the seating element 20 is in a lower position. In a second end position of the displacer means 14 a bottom portion of the slotted hole 21 of the guiding means 21 overlaps with a bottom portion of the displacer means 14 and when the displacer means 14 is in the second end position the seating element 20 is in an upper position vertically above the lower position. In particular, the seat adjustment device 10 comprises equivalently constructed and/or equivalently operating further guiding means 21 and further transmission means 15' for guiding along the further structural element 13' at the bracket 12.

Figure 4:
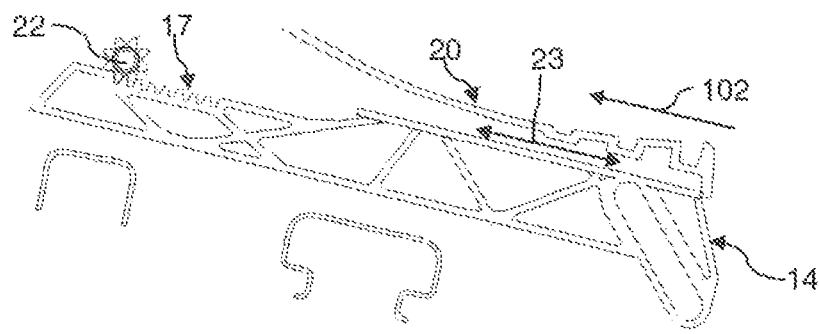

FIG. 4 schematically shows a sectional illustration of a seating element 20 and a displacer means 14, wherein a sliding element 23 is disposed between the seating element 20 and the displacer means 14. The sliding element is configured to enable a movement of the displacer means 14 into a horizontal direction 102 relative to the seating element 20 and/or cushion placed on the seating element 20 Here, the movement of the displacer means 14 is driven by a pinion 22, in particular rotatably connected with the seating element 20 by positive interlocking transmission of the rotational movement of the pinion 22 into a movement parallel to the horizontal direction 102 of the rack 17, which is fixedly connected to the displacer means 14, The rack 17 is in preferably connected to the displacer means 14 by a force-fitted connection.

Figure 5:
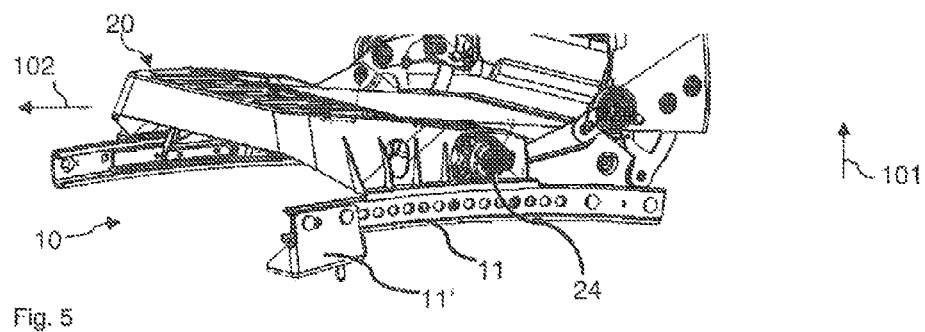

FIG. 5 schematically shows a perspective illustration of a seating element 20 and a seat adjustment device 10. The seat adjustment device 10 is configured to lift the seating element 20 parallel to the vertical direction 101. Further, the seating device 20 and/or the backrest 30 (see FIG. 1) is/are adjustable parallel to the horizontal direction 102. Here, the seat 1 is slidably arranged on guide rails 11 that are fixedly attached by anchoring means 11' to the vehicle, in particular to the vehicle chassis. The seat adjustment device 10 and therefore the whole vehicle seat 1 is/are locked in its position in case of a crash by means of a clutch 24 that is disposed on the seat adjustment device 10 or the seating element 20.

Figure 6:
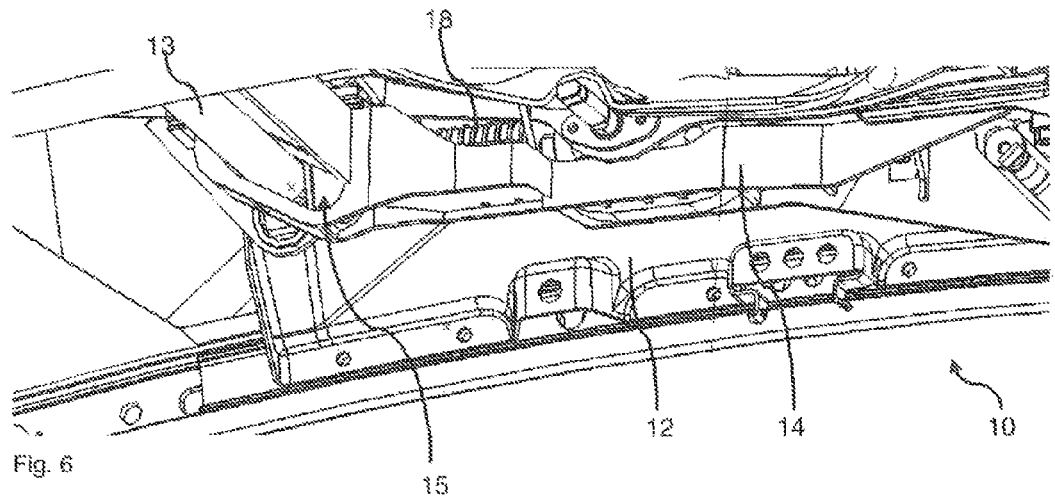
Figure 7:
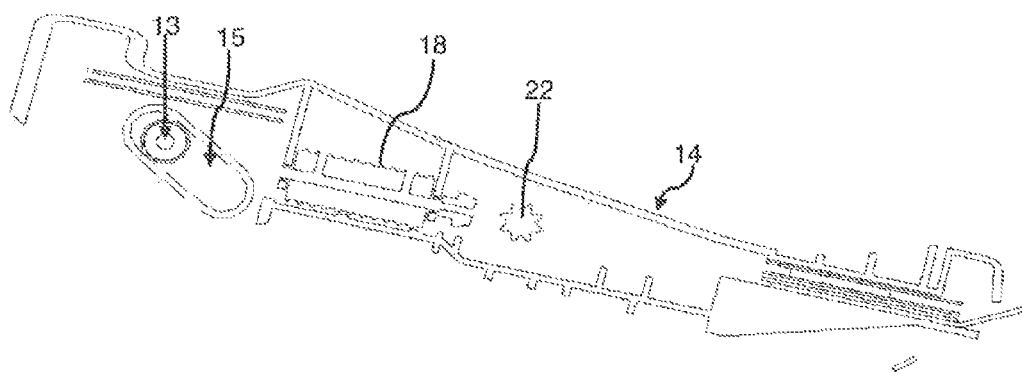

FIGS. 6 and 7 schematically show a second embodiment of the seat adjustment device 10, wherein a drive screw 18 is attached to the displacer means 14. The drive screw 18 is rotatable around an axis of rotation that is parallel to the horizontal direction 102. Thus, by turning the drive screw 18, the displacer means 14 is moved relative to the bracket 12, in particular substantially parallel to the horizontal direction 102. Due to the horizontal movement of the transmission means 15 and the displacer means 12, the seating element 21 is lifted between an upper position ice shown in FIGS. 6 and 7) anti a lower position (not shown) in reaction with the guiding means 21 at the structure 20' of the seating element 20 that constrain the movement of the structural element 13—and therefore of the seating element 20—elative to the horizontal direction 102 such that the seating element 21 is only movable parallel to the vertical direction 101. The drive screw 18 in particular comprises a self-locking thread being configured to prevent the structural element 13 from returning back into the tower position, in particular due to the weight of a user seated on the seating element 20.

Figure 8A:
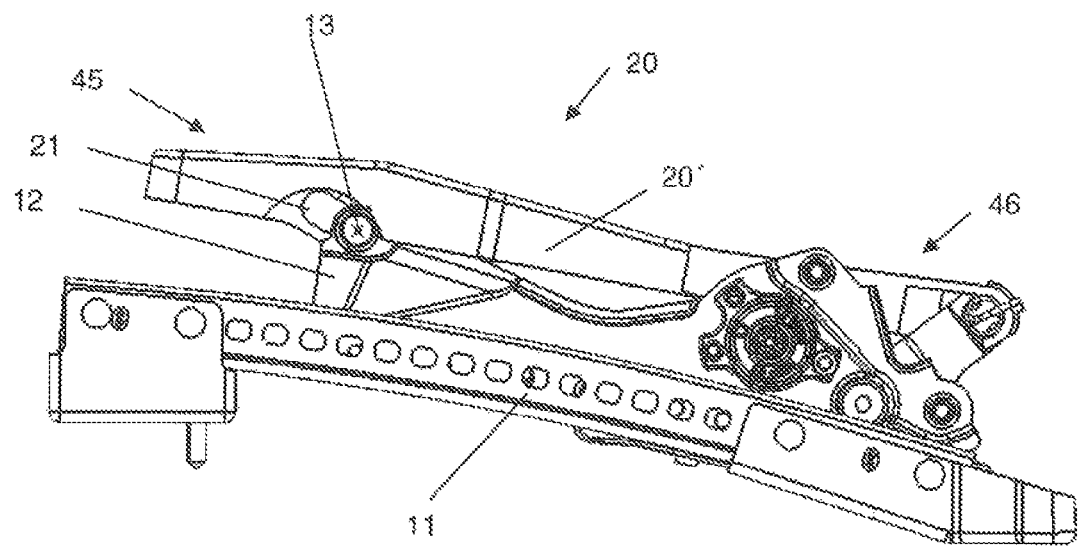
FIG. 8a-9 show another embodiment of the seat adjustment device.
Figure 9:
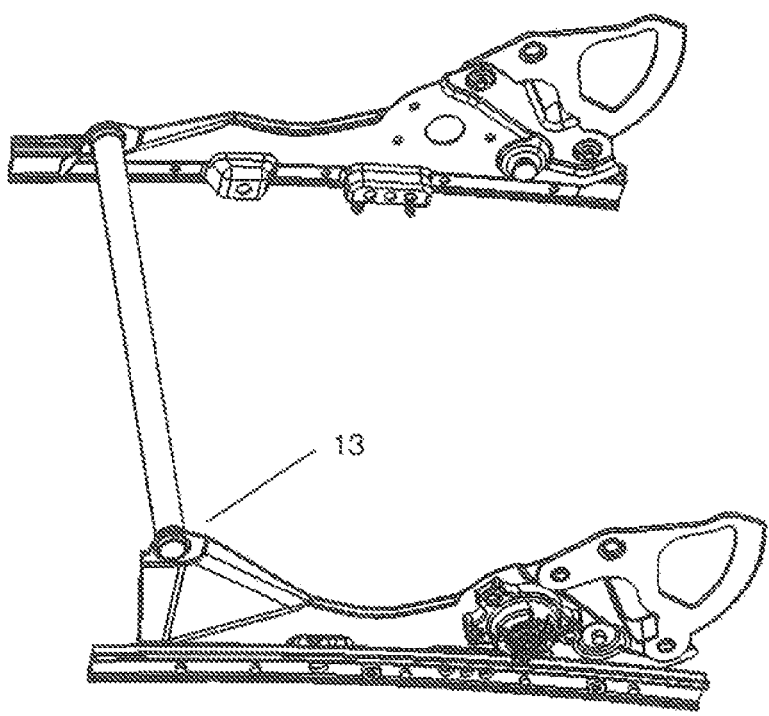

FIGS. 8a and 9 show a further embodiment of the vehicle seat according to the invention. In the present case, the lower rail 11 is provided which is attached to the vehicle body. According to the invention, the seating element 20 has in its front region 45 the thigh rest, a guiding means 21, here a slot 21 or a slotted hole, into which a structural element 13, here a crossmember, particularly a tube, which is affixed to the bracket 12. Furthermore, the seating element is mounted on a pivot lever in its rear region 46. In case the seating element 20 is now intended to be raised, the pivot lever is rotated in the clockwise direction, as a result of which the rear pad 46 of the seating element 20 rises. At the same time, the seat shell is raised in its front region 45, in that the slot 21 moves along the structural element 13. The height of the seating element 20 is consequently adjusted in its front region by a linear movement and in its rear region by rotation. Preferably, a spring means is provided between the seating element 20 and the bracket 12. This spring means can reduce the forces required of the occupant to actuate, but can also support the height adjustment of the seating element 20. Preferably, the movement of the seating element 20 is limited. This can be carried out by any desired means familiar to a person skilled in the art. The seating element 20 is lowered in an analogous manner. As can be gathered in particular from FIG. 9, the vehicle seat according to the invention has a structural element, here a cross member 13, which is connected firmly to the bracket 12 of the structure of the at part and does not move when the height of the seat shell is adjusted. The seating element 20 slides along the cross member 13 as its height is adjusted. The seating element 20 is supported on this cross member 13 in the event of a front-end impact, and so said cross member 13 absorbs all the forces and moments of momentum that occur in the event of such an accident.

Figure 8B:
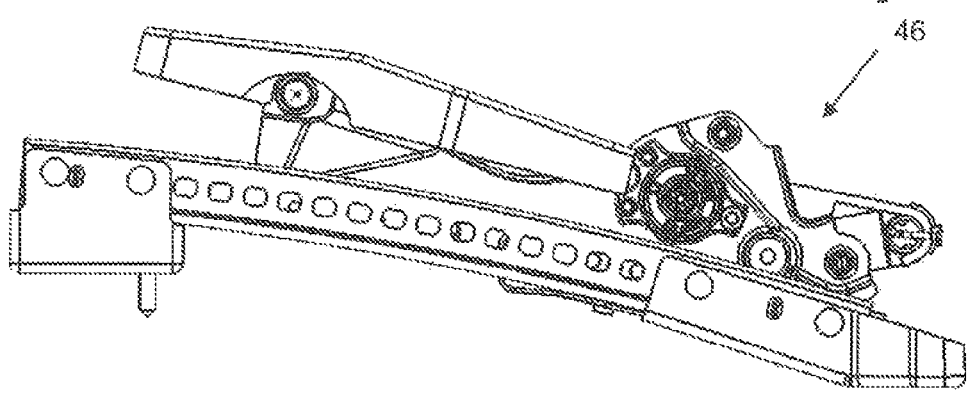
Figure 10:
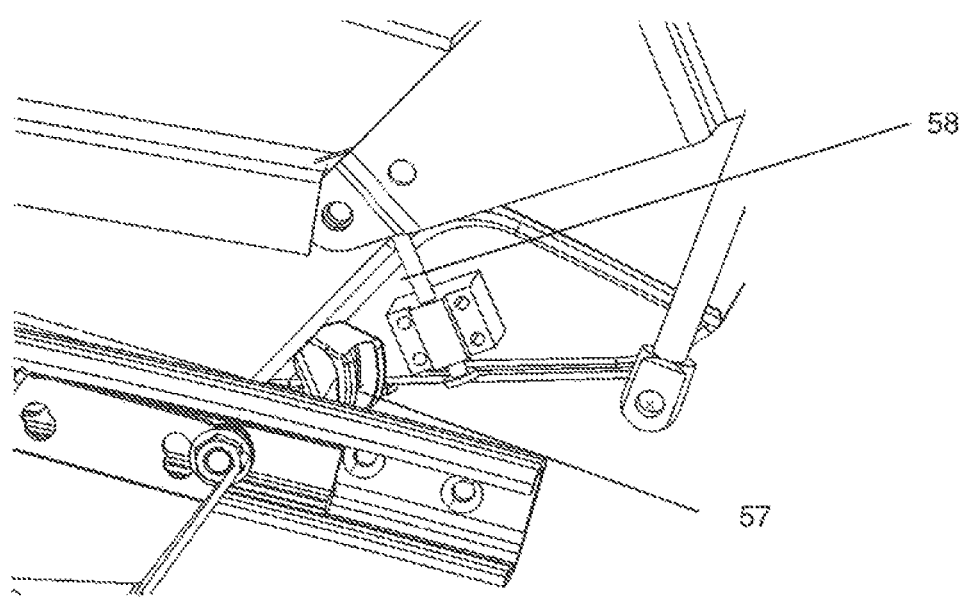
FIG. 10 shows a preferred embodiment of the adjustment device according to FIGS. 8a-9.

FIG. 10 shows a preferred, alternative embodiment of the vehicle seat according to FIGS. 8a-9. In the present case, the seat has a cable pull 57, for example a Bowden cable and a guide 58. The height of the seating element 20 can be adjusted by way of the cable pull. In particular, the seat shell cart be moved thereby into a lowered position, with the seating element 20 being moved into the raised position preferably by spring force or output device exerting force on the cable or could be raised by the occupant reducing forces exerted onto the cushion. During the upward end downward movement, the seat shell is guided by the guide 58, which preferably also limits its movement. For this purpose, the guide 58 has at least one stop. In the present case, the guide configured as a pin which slides in a bearing. A person skilled in the at will recognize that other guides are also possible. For example, an element bent in the shape of a U can be provided on the seat shell. The limbs of the U slide along a guide, which is preferably arranged vertically, for example a pin, which is enclosed by the limbs of the U.

LIST OF REFERENCES

1 Seat
10 Seat adjustment device
11 Guide rails
11' Anchoring means
12 Bracket
13 Structural element
13' Further structural element
14 Displacer means
15 Transmission means
15' Further transmission means
16 Ramp
16' Further ramp
17 Rack
18 Drive screw
20 Setting element
20' Structure
21 Guiding means 21' Further Guiding means
22 Pinion
23 Sliding element
24 Clutch
25 Guiding element
30 Backrest
40 body of the vehicle
45 front region of the seating element
46 rear region of the seating element
57 Cable pull, Bowden cable
58 Guide
101 Vertical direction
102 Horizontal direction

What is claimed is:

1. A seat adjustment device which adjusts a height of a seating element relative to a body of a vehicle, wherein the seating element comprises a structure, wherein a guiding element is provided at the structure, which restricts a movement of the seating element during a height adjustment,
wherein the seat adjustment device further comprises a bracket including a structural element and displacer element located between the bracket and the structure;
wherein the structural element is engaged with a slotted hole of the displacer element and the guiding element;
wherein the guiding element is a slotted hole having a main direction of extension arranged parallel to a vertical direction;
wherein the main direction of extension of the slotted hole is tilted relative to a horizontal direction;

wherein the displacer element is moved in the horizontal direction and thereby lowers and lifts the seating element; and wherein the guiding element restricts the movement of the seating element to the vertical direction.

2. The seat adjustment device according to claim 1, wherein the structural element is a tube extending through the guiding element.

3. The seat adjustment device according to claim 1, wherein a the slotted hole of the displacer element is tilted relative to the guiding element.

4. The seat adjustment device according claim 3, wherein the guiding element is provided in a region of a thigh rest.

5. The seat adjustment device according to claim 4, wherein a rear region of the seating element is adjustable in height relative to the body of the vehicle.

6. The seat adjustment device according to claim 5, wherein the rear region comprises a pivot lever, which lowers and lifts the rear region of the seating element.

7. The seat adjustment device according to claim 5, which comprises the guiding element at the rear region of the structure of the seating element.

8. The seat adjustment device according to claim 5, wherein the displacer element comprises a slotted hole at its rear end.

* * * * *